2 Sheets—Sheet 1.

S. A. SKINNER.
MACHINE FOR HUSKING CORN.

No. 18,662. Patented Nov. 17, 1857.

2 Sheets—Sheet 2.

S. A. SKINNER.
MACHINE FOR HUSKING CORN.

No. 18,662. Patented Nov. 17, 1857

UNITED STATES PATENT OFFICE.

SMITH A. SKINNER, OF LAWRENCE, MASSACHUSETTS, ASSIGNOR TO HIMSELF, AND HERMAN A. DOSTER, OF BETHLEHEM, PENNSYLVANIA.

CORN-HUSKER.

Specification of Letters Patent No. 18,662, dated November 17, 1857.

*To all whom it may concern:*

Be it known that I, SMITH A. SKINNER, of Lawrence, in the county of Essex and State of Massachusetts, have invented an Improved Machine for Husking Corn; and I do hereby declare that the same is fully described and represented in the following specification and the accompanying drawings, of which—

Figure 1:
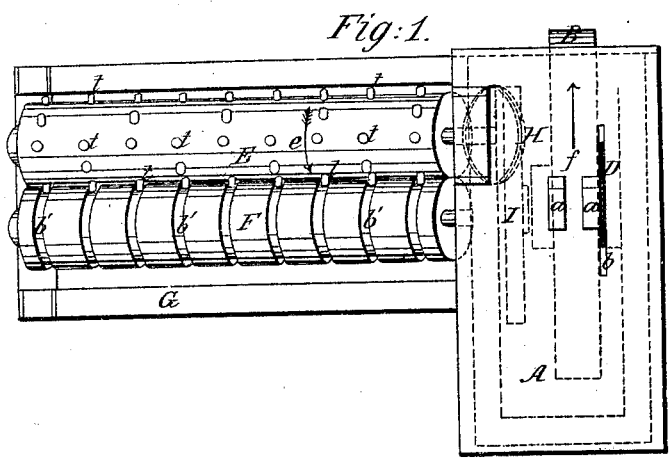
Figure 2:
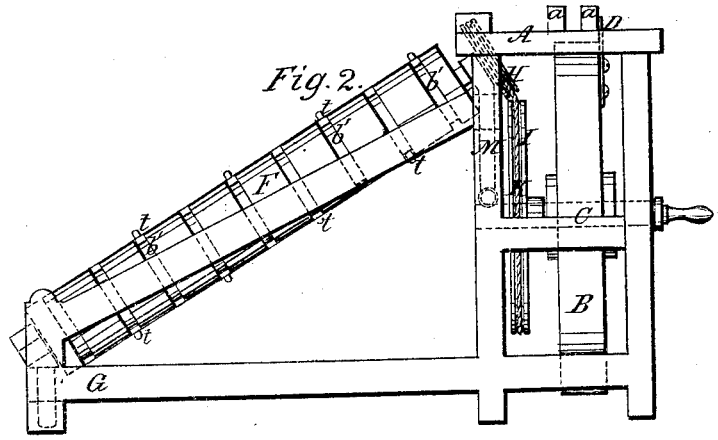
Figure 3:
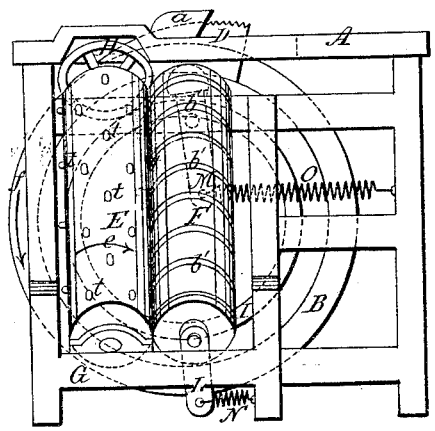
Figure 4:
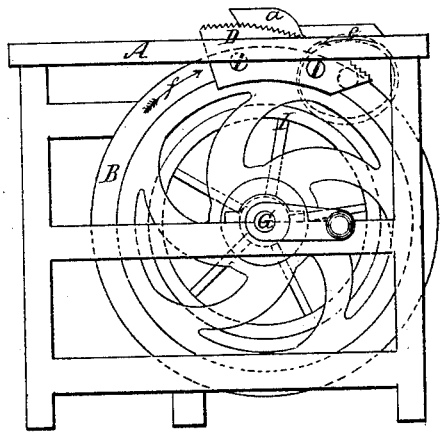
Figure 5:
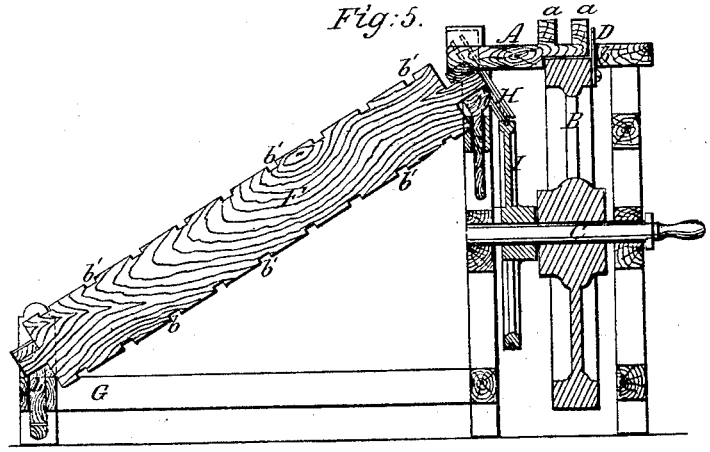

Figure 1, is a top view of the said machine. Fig. 2, a side elevation of it. Figs. 3, and 4, are end views of it. Fig. 5, a vertical and longitudinal section taken through the machine and in line of the axis of its grooved pressure roller.

The nature of my invention consists in the arrangement of teeth and grooves of two rollers whereby the husk will not only be stripped from the ear of corn, but the ear put in rotation so as to accomplish the stripping operation entirely around it.

In the drawings, A, denotes a bed or table having its upper surface furnished with two or any other suitable number of stops or projections a, a, raised upon it. Within this frame, there is arranged a fly wheel, B, and its shaft C, the said fly wheel having a serrated cutter, D, fastened to its rim and formed and made to project therefrom as seen in Figs. 2, and, 3. Such cutter during the revolution of the fly wheel, will be carried into and through a slot, b, formed through the bed, A, the whole being so that when an ear of corn is laid on the bed and held against the stops a, a and so as to extend over the slot, such ear may be cut and separated transversely by the serrated cutter, while it is in revolution. The upper surface of the table A, is arranged horizontally or thereabouts and there extends downward at an inclination to the horizon a pair of drums or rollers E, F, the same being arranged with respect to the table and the serrated cutter as shown in the drawings. One of these rollers, viz, that marked, E, is furnished with rows t, t, of teeth extending around it transversely, while the other roller is constructed with a series of grooves b' b', b' also extending around it transversely and corresponding in number and distance apart with the rows of teeth of the roller E, the same being so as to enable the curved surfaces of the rollers to be brought into contact with one another, each row of teeth under such circumstances extending into one of the grooves. The journals of the roller, E, are supported in stationary boxes applied to the frame and an extension, G, thereof, shown in the drawings. The shaft of the said roller carries a grooved pulley, H, around which and another grooved pulley, I, (fixed on the fly wheel shaft) a cross band, K, runs, such being so arranged as to cause the roller, E, to be rotated in the direction of the arrow, e, when the fly wheel is rotated in the direction of the arrow, f, shown in Fig. 3.

The roller, F, is what is termed a pressure roller, its journals being supported by two levers L, M, to whose lower arms and the frame, springs N, O, are connected such being so as to press the roller, F, toward the roller, E, and enable it to move away therefrom as may be necessary during the operation of the machine.

In using this machine an attendant stands in a convenient position to put in rotation its driving wheel, which he may accomplish, either by means of a crank or a foot treadle properly applied to the shaft, C. While the wheel is in revolution he seizes an ear of corn, having the husk upon it, and lays it upon the bed or table and against the projections, a, a, and in a position to cause the stalk and husks to be separated from the ear. This having been effected, he throws the ear with the husk upon it into the channel between the rollers E, and, E, down which it will pass by the action of gravity. These rollers being in rotation, each toward the other, the teeth of one will seize upon the husk, and rotate the ear and introduce the husks into the bite of the two rollers so as to enable the rollers to catch and draw the husks entirely away from the ear, the said husks falling down upon the floor or ground directly underneath the rollers, the ear of corn being finally discharged from the machine by the action of gravity.

The great merit of my machine is in its simplicity. I employ no endless carrier, which requires the husk separating apparatus to be placed below it in order that the corn after having been sawed may fall into such apparatus. The rollers of my machine, are arranged so as to incline downward from or near the top of the table, and in the most convenient position for the attendant to throw or place in the channel between them, an ear of corn immediately after it may have been cut by the saw. Besides this, the saw is arranged on the edge of, or fixed to the fly wheel. This renders unnecessary a separate shaft, pulleys and belt for operating the fly wheel. Then again, the pulleys and band for putting the main roller in rotation are conveniently disposed for such.

I am aware that my machine contains some mechanical devices incident to other machines for husking corn, that is, it contains a serrated cutter, and a means of stripping the husk from the ear. I therefore do not claim the employment of a saw or cutter in connection with an endless carrier to hold the ear of corn, and so present it to the said saw as to enable the latter to separate the stalk and husks from the ear; nor do I claim the employment of an inclined, grated spout or grid and a toothed cylinder having its teeth operating through the spaces between the bars of the spout and so as to seize the husks and separate them from the ear, while the latter by the action of gravity passes down the spout. I am also aware that for separating the husk from the ear of corn, two rollers have been employed, each of which has been constructed with teeth and grooves arranged circumferentially on it, and so that the teeth of one roller worked into the grooves of the other while the teeth of the latter worked into the grooves of the former; in this case, however, the ear of corn being seized on opposite sides by the teeth of both rollers, could not easily revolve so as to be entirely stripped of its husk, the conjoint operation of the teeth of the two rollers operating also to cause the teeth to penetrate the husks and tear the kernels of corn out of the ears. With my improvement of having the teeth only on one roller while the grooves are in the other only, the ear will be caused to rotate while it is being stripped, and thus will be stripped to better advantage and without the liability of the kernels being torn out of the ear.

Therefore I do not claim fluted or corrugated rollers for husking corn; nor the employment and use of rollers, irrespective of my improved arrangement of teeth and grooves; nor do I claim making each roller with teeth and grooves, but what I claim is—

The arrangement of the teeth in one roller in combination with the arrangement of the grooves entirely in the other roller, the same serving to effect the rotation of the ear of corn, as well as the removal of the husk, and its presentation to the bite of the rollers as specified.

In testimony, whereof I have hereunto set my signature.

SMITH A. SKINNER.

Witnesses:
GEORGE R. ROWE,
W. H. SKINNER.